Oct. 31, 1933.  F. KURZ  1,933,440
ELECTRIC MOTOR
Filed Jan. 8, 1932   2 Sheets-Sheet 1
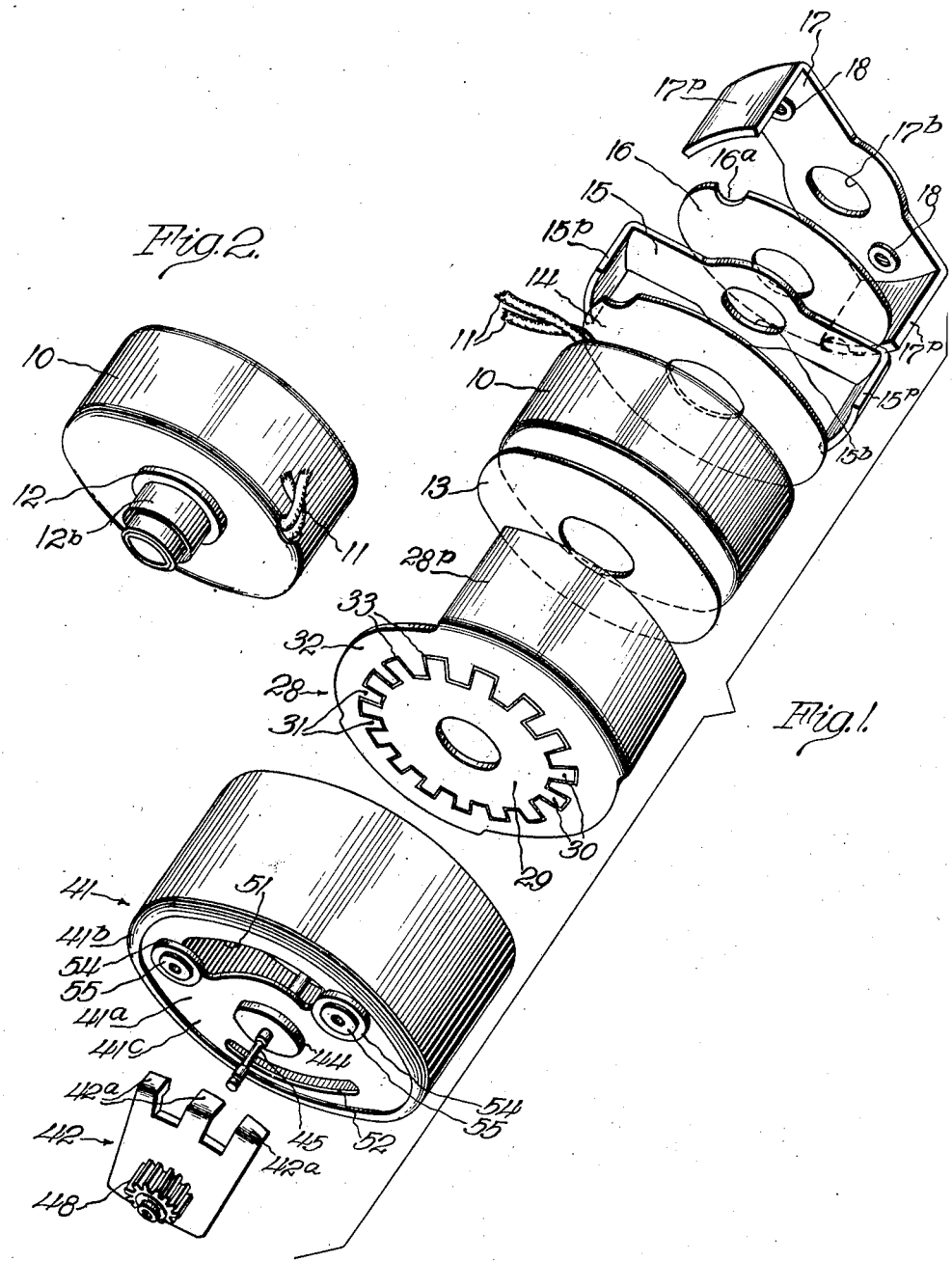
Inventor:
Fred Kurz
By Brown, Jackson, Boettcher & Dienner
Attys.

Oct. 31, 1933.   F. KURZ   1,933,440
ELECTRIC MOTOR
Filed Jan. 8, 1932   2 Sheets-Sheet 2

Inventor:
Fred Kurz
By Brown, Jackson, Boettcher & Dienner
Attys.

Patented Oct. 31, 1933

1,933,440

UNITED STATES PATENT OFFICE 1,933,440

ELECTRIC MOTOR

Fred Kurz, Springfield, Ill., assignor to Sangamo Electric Company, Springfield, Ill., a corporation of Illinois Application January 8, 1932. Serial No. 585,418

17 Claims. (Cl. 172—275)

The present invention relates to an alternating current electric motor having numerous improved features, the majority of which have particular application to a self-starting synchronous motor of small size for use in electric clocks, time switches, electric meters, etc.

The general object of the invention is to improve upon these small self-starting synchronous motors to obtain a more efficient and reliable operation.

Another object of the invention is to produce such a motor structure which is of more compact dimension, this being highly advantageous to permit the motor to be used in very small clocks and in cramped space in time switches, electric meters, etc. One of the features of the invention, enabling this more compact construction to be obtained, is the grouping of the two sets of poles, one of which sets of poles produces the rotating flux field for cooperating with the induction element of the rotor, and the other of which sets of poles produces the alternating flux field for cooperating with the synchronous element of the rotor. The poles of the first set, producing the rotating flux field, are annularly grouped about the energizing coil with cooperating pairs of poles extending across the peripheral surface of the coil; and the poles of the second set, producing the alternating flux field, are disposed in a single plane directly at one end of the coil. This also enables a considerable part of the rotor to embrace the coil.

Another object of the invention is to produce a small self-starting synchronous motor which will have a comparatively low synchronous speed while still producing a relatively high torque.

Another object of the invention is to provide a simplified motor structure which can be manufactured and assembled at a low cost.

Other objects and advantages of the invention will appear from the following detailed description of a preferred embodiment thereof. In the accompanying drawings illustrating such embodiment:

Fig. 1 is a perspective view, in exploded relation, illustrating the parts employed in making one of these motors;

Fig. 2 is a similar perspective view, better illustrating the coil assembled on the core;

Figure 3:
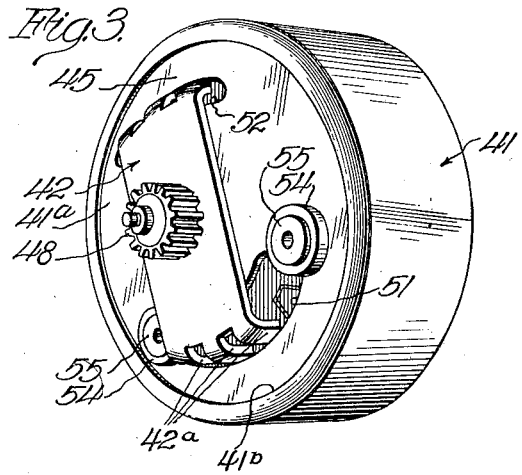
Fig. 3 is a perspective view illustrating the front of the assembled motor.

The energizing coil is indicated at 10, and the conductors carrying current thereto are indicated at 11. This coil is mounted on a magnetic core 12, the ends of which project from opposite ends of the coil. Slipping over the ends of the core 12 and engaging opposite ends of the coil 10 are two electrical insulating discs 13 and 14 composed of paper, fibre or the like. The front and rear ends of the core are formed with reduced extensions 12a and 12b, respectively, on which are mounted the elements forming the various poles of the stator structure. Mounted on the rear extension 12b of the core is a sheet steel stamping 15 of U-shape, as best illustrated in Fig. 1. The flat transverse portion of this pole member 15 has a central opening 15b therein which slips over the core extension 12b, this portion of said pole member being rigidly held against the shoulder at the inner end of the core extension 12b in the complete assembly. The extremities of said pole stamping are stamped laterally to form the pole extensions 15p, and these are of arcuate curvature to fit over the coil 11 and to present a cylindrical outer surface. The flux in the pole extensions 15p is always of the same polarity as the end 12b of the core and in phase therewith.

Slipping over the core extension 12b, on the outer side of the pole member 15, is a centrally apertured disc 16 which is adapted to lag the flux in the outer pole member 17. This lagging disc is preferably composed of copper.

Figure 5:
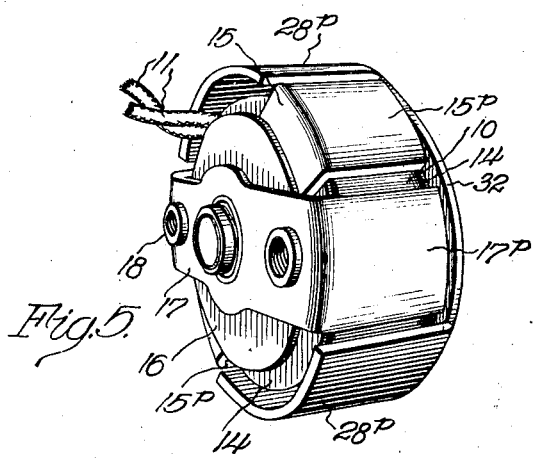
Fig. 5 is a perspective rear view of the stator, with the rotor removed.

This outer pole member 17 is substantially the same as the inner pole member 15, in its preferred form likewise being a steel stamping having a central aperture 17b and having forwardly projecting arcuate pole extensions 17p. As shown in Fig. 5, the two pole members 15 and 17 are assembled in angularly offset relation but with their extensions 15p and 17p close together whereby adjacent pole extensions form in effect the two sections of a single pole, one of which sections is shaded or lagged with respect to the other section.

Figure 6:
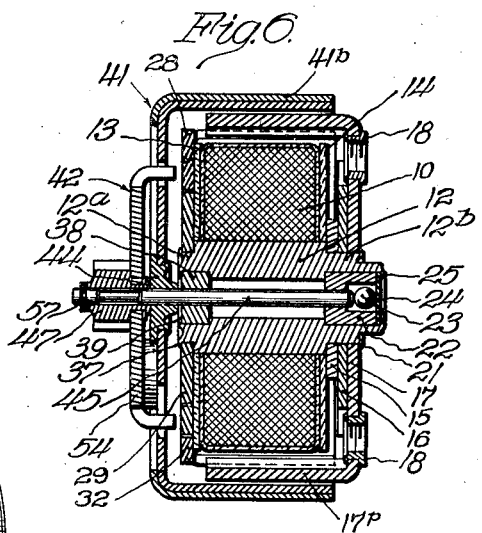
Fig. 6 is a longitudinal sectional view through the assembled motor.

The diametrical flat portion of the pole member 17 is provided with bushings or eyelets 18 riveted therein, which, as shown in Fig. 6, are internally threaded. These eyelets provide tapped holes in the stator structure for receiving suitable attaching screws by which the motor can be mounted on a suitable frame or supporting structure. The copper lag plate 16 is provided with diametrically opposite notches 16a to clear the projecting inner ends of these eyelets, which are preferably of brass. As shown in Fig. 6, the pole members 15 and 17 together with the intervening copper lag disc 16 are rigidly mounted on the reduced portion 12b of the core by spinning or riveting a bead 21 from the end of the core extension outwardly over the outer side of the pole member 17. A bearing bushing 22 is mounted in this end of the core for receiving the rotor spindle, and this bushing has a slightly enlarged counterbore for receiving a ball thrust bearing 23 against which the end of the rotor spindle bears. The outer end of this counterbore is closed off by an end head in the form of a disc 24, and the bushing 22 and end disc 24 are secured in place by spinning or riveting a bead 25 from a further reduced extension of the core over the outer surface of the disc 24. To prevent the shunting of any flux through the rotor spindle the bushing 22 is of non-magnetic material, such as bronze, and the end head 24 may also be of non-magnetic material, or a paper or fibre washer may be interposed between this end head and the ball 23.

Mounted on the core extension 12a at the front side of the coil is a pole member 28 which is a composite structure constituting the poles of the stationary axis alternating magnetic field and half the poles of the rotating magnetic field. This pole member 28 comprises a center sheet steel disc 29 having a ring of substantially rectangular teeth 30 projecting therefrom. Mounted on this center disc is an outer annulus 32 having a ring of inwardly projecting, substantially rectangular teeth 31 which extend into the tooth spaces in the disc 29. The two rings of teeth 30 and 31 are held in magnetically spaced relation by filling all intervening spaces between the two rings of teeth with any suitable non-magnetic metal or alloy, such being indicated at 33; or, by securing copper or brass rivets at spaced intervals to engage in opposite depressions in the two rings of teeth.

Figure 4:
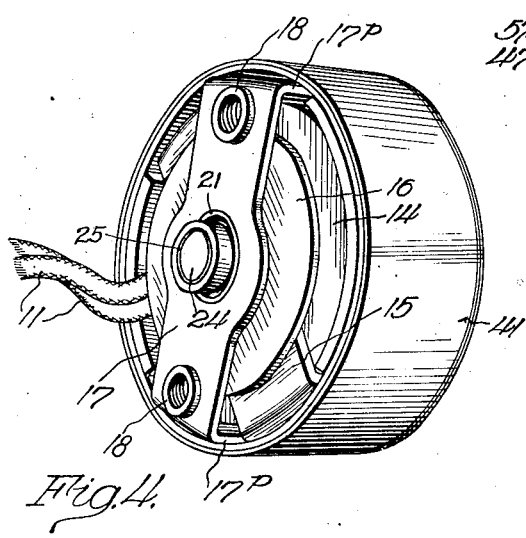
Fig. 4 is a perspective view illustrating the rear of the assembled motor.

Projecting rearwardly from the peripheral portion of the annulus 32, at substantially diametrically opposite sides thereof, are two pole extensions 28p which are given an arcuate curvature to fit over the coil at 10. These pole extensions 28p are of the same outer diameter as the pole extensions 15p and 17p, and fit into the arcuate spaces defined between the two pairs of latter poles 15p, 17p, in spaced relation thereto, as shown in Figs. 4 and 5. Said pole extensions are of approximately twice the angular width of the pole extensions 15p or 17p and complete the pole grouping of the rotating flux field; at any instant of flux flow the pole extensions 28p are of the polarity of the core extension 12a, and the pole extensions 15p and 17p are of the same polarity as the core extension 12b, with the flux in the pole extensions 17p lagged behind the flux in the pole extensions 15p. With reference to the stationary axis alternating magnetic field, the non-magnetic gap 33 between the two rings of pole teeth 30 and 31 results in a flux leakage from each pole tooth of one ring to adjacent pole teeth of the other ring and this results in an alternating magnetic field being established between these pole teeth with one ring of teeth of one polarity during one alternation and of the other polarity during the other alternation.

Referring to Fig. 6, the pole structure 28 is rigidly mounted on the front core extension 12a by spinning or riveting a bead 37 from this core extension outwardly over the outer side of the disc element 29. The disc 29 and annulus 32 are made of magnetic material such as steel. A bearing bushing 38, preferably composed of bronze, is provided in the front end of the core 12 for the rotor spindle, this bearing bushing being preferably held in place by forming a bead 39 from the end of the core over the outer face of the bushing.

The rotor comprises an induction element 41 and a synchronous element 42. The induction element of the rotor is of cup-shape, comprising a cup-shaped non-magnetic portion 41a and an outer magnetic sleeve 41b. The non-magnetic portion 41a, which is preferably composed of aluminum, has its end head or web portion 41c rigidly secured to a collar 44 which in turn is made fast on the rotor spindle 45. The magnetic portion 41b preferably consists of a sleeve or cup of soft steel or iron which has a tight fit over the annular flange portion of the aluminum or copper cup 41a. The annular flange portion of the induction rotor element 41 surrounds the pole extensions 15p, 17p and 28p, in closely spaced relation thereto, with the steel or iron part 41b of the rotor serving as a return path for flux emanating from these pole extensions and passing through the aluminum or copper flange portion of the rotor.

The synchronous element 42 of the rotor consists of a permanently magnetized bar magnet secured to a brass bushing 47, the projecting outer end of which is formed with pinion teeth 48. This bushing is rotatably mounted on the rotor spindle 45, whereby the magnet 42 can revolve relatively to the induction element 41. Each end of the magnet 42 is slotted to form a plurality of pole teeth 42a, there being preferably three of these teeth projecting from each end. Said teeth are formed to project inwardly through arcuate slots 51 and 52 provided at diametrically opposite sides in the web portion 41c. Relative rotation is permitted between the induction element 41 and the bar magnet 42 until the side edges of the bar magnet strike the extremities of the arcuate slots 51 and 52. This lost motion relation between the two elements of the rotor facilitates the operation of the permanently magnetized element 42 falling into synchronism with its alternating flux field as synchronous speed is approached, and also aids in allowing said rotor element 42 to continue running at synchronous speed against the action of torque changes. The side edges of the magnet element 42 may strike the ends of the slots 51 and 52 directly without in any manner disturbing the intended normal operation of the motor; although, if it is desired to eliminate the slight clicking noise resulting from this engagement during torque changes, such is accomplished by providing silencing stops or bumpers 54 at the extremities of one or both slots. In the preferred construction illustrated, these silencing stops consist of leather washers secured to the web portion 41a by rivets 55 of aluminum or other non-magnetic material, the leather washers being disposed with their edges overlying the end portions of the slots 51 where they will be engaged by the side margins of the synchronous magnet 42.

The permanent magnet 42 is preferably of such diameter that its three pole teeth 42a at each end thereof revolve on a radius substantially midway between the inner and outer extremities of both rings of stator pole teeth 30, 31, see Fig. 6. Each rotor pole 42a is of approximately the same angular width as the stator poles 30, 31, which are of like width, and the spaces between the rotor poles 42a correspond in width substantially to the width of the tooth spaces in the rings of stator teeth. The magnet 42 is permanently magnetized, prior to its assembly in the motor, with one end thereof having one polarity and the other end the opposite polarity. It is desirable to magnetize this member to have a high residual and coercive force, and in the preferred construction I make this magnet of cobalt steel, although it can be constructed of one of the tungsten or chromium magnet steels if desired. The rotor element 42 may be detachably mounted on the rotor spindle 45 by providing a removable washer or key 57 which is slipped into an annular groove in the outer portion of the spindle, such key member, however, permitting this rotor element to oscillate on the rotor spindle.

The operation of the motor is generally as follows: The energization of the coil 10 during one alternation transmits flux of one magnetic polarity through the pole members 15, 17 to the pole extensions 15p and 17p, and transmits flux of the opposite magnetic polarity through the front pole member 28 to its pole extensions 28p. A rotating flux field is established between these pole extensions the field having this rotating characteristic by virtue of the phase displacement of the flux threading the lagged pole extensions 17p. This field acts on the induction element 41 of the rotor, setting the latter into rotation in a direction determined by which side of the pole extensions 15p the lagged pole extensions 17p are disposed. The induction element 41 of the rotor exerts sufficient torque upon starting to overcome the standstill locking torque of the synchronous element 42, and the normal free running speed of the induction element 41 is preferably considerably higher than the synchronous speed of the motor, so that the induction element 41 rapidly carries the synchronous element 42 up to synchronous speed. At this point, the synchronous element 42 locks into synchronism with the flux field alternating between the pole teeth 30, 31. As previously remarked, during one alternation the inner ring of teeth 30 is of one magnetic polarity and the outer ring of teeth 31 is of the opposite magnetic polarity, and during the next alternation this relation of magnetic polarities reverses. The synchronous torque of the element 42 locking into step with this alternating flux field exceeds the induction torque tending to carry on to a higher speed and hence the rotor is held at this synchronous speed. By having the synchronous element 42 rotate at a speed which is subsynchronous relative to the theoretical synchronous speed of the induction element and which is also below the normal free running speed of the induction element the torque of the induction element at this speed is added to the torque of the synchronous element 42 for producing a higher torque available from the motor. A motor constructed as shown, provided with fifteen poles in each ring of poles, 30, 31, has a synchronous speed of 240 R. P. M. when operated on 60 cycle current. Of course the number of poles in the alternating flux field can be increased or decreased for lower or higher synchronous speeds; and likewise, the number of poles in the rotating flux field can be increased if desired by providing an increased number of pole members 15, 17 of narrower width and by correspondingly increasing the number of pole extensions 28p projecting from the front pole member 28.

It will be observed that by having the pole extensions 15p and 17p project forwardly over the coil 10 and by having the pole extensions 28p project rearwardly over said coil, the axial dimension of the stator and correspondingly of the motor is considerably reduced. Also, by this arrangement of the poles of the rotating flux field, and by arranging the lagging means 16 at one end of the stator structure, the cup-shaped induction element 41 of the rotor can be slipped over the other end of the stator structure and to embrace the coil and thereby assist in foreshortening the motor. The disposal of the lagging means 16 at the opposite end of the stator or opposite end of the coil prevents interference with the assembly of the rotor element over the front end of the stator. The mounting of the iron or steel band 41b directly on the rotor affords a return path for the magnetic flux in the rotating field and avoids the necessity of an outer housing to establish this return path. The disposal of the rings of poles 30, 31 in a diametrical plane directly at one end of the coil 10 also results in a shorter stator structure. By securing the cup-shaped induction element 41 to the rotor spindle 45 in immediate proximity to the bearing 38 the two bearings 22 and 38 afford ample bearing support for this rotor element without the necessity of any outside frame bearing. The end thrust set up by the magnetic attraction of the poles 42a of the synchronous element 42 toward the stator poles 30, 31 is borne by the ball bearing 23. If desired, any suitable clip or abutment may be provided to be engaged by the outer end of the rotor spindle for preventing outward displacement of the spindle. The series relation between the rotating magnetic field, defined by the pole portions 15p, 17p and 28p, and the alternating magnetic field, defined by the pole portions 30 and 31, also enables a more compact and reliable construction to be obtained.

Having thus described my invention, what I claim as new and desire to secure by Letters Patent is:

1. In a synchronous motor, the combination of a field coil, a core therein, a pole member mounted on one end of said core comprising pole extensions embracing the coil, a pole member mounted on the other end of said core comprising two annular elements having cooperating rings of pole teeth and comprising pole extensions projecting from one of said annular elements and embracing said coil, and a rotor comprising a cup-shaped induction element embracing said pole extensions and also comprising a synchronous element rotating adjacent to said rings of pole teeth.

2. In a self-starting synchronous motor, the combination of a coil, a core therein, pole means mounted on one end of said core comprising pole extensions embracing the coil, pole means mounted on the other end of said core comprising two annular elements having cooperating rings of magnetically spaced pole teeth and comprising pole extensions projecting from one of said annular elements and embracing said coil, lag means cooperating with one of said pole means for creating a rotating field between said pole extensions, and a rotor comprising a cup-shaped induction element embracing said pole extensions and driven by said rotating field, and also comprising a synchronous element rotating adjacent to said rings of pole teeth.

3. In a self-starting synchronous motor, the combination of a field coil, a core element therein, a pair of pole members mounted on one end of said core each comprising pole extensions embracing the coil, a lag element disposed between said pole members for lagging the flux in one of said members, a pole member mounted on the other end of said core comprising two annular elements having cooperating rings of pole teeth and comprising pole extensions projecting from one of said annular elements and embracing said coil, said latter pole extensions cooperating with the pole extensions of said first named pair of pole members for establishing a rotating magnetic field, and a rotor comprising a cup-shaped induction element embracing said pole extensions to be driven by said rotating field and also comprising a synchronous element rotating adjacent to said rings of pole teeth.

4. In a self-starting synchronous motor, the combination of a field coil, a core therein, a pole member mounted on one end of said core comprising pole extensions embracing said coil, a pole member mounted on the other end of said core comprising two annular elements having cooperating rings of pole teeth and comprising pole extensions projecting from one of said annular elements and embracing said coil, means cooperating with one of said pole members for creating a rotating field, a rotor comprising a synchronous element rotating adjacent to said rings of pole teeth and comprising a cup-shaped induction element embracing said pole extensions, and means mounted on the induction element of the rotor affording a return path for the flux from said pole extensions.

5. In a self-starting synchronous motor, the combination of a field coil, a core therein, a pair of pole members mounted on one end of said core each comprising pole extensions embracing the coil, lag means interposed between said pole members for lagging the flux in one of said members, a pole member mounted on the other end of said core comprising two annular elements having cooperating rings of pole teeth and comprising pole extensions projecting from one of said annular elements and embracing said coil, said latter pole extensions cooperating with the pole extensions of said first named pair of pole members for creating a rotating flux field, a rotor comprising a synchronous element rotating adjacent to said rings of pole teeth and comprising a cup-shaped induction element embracing said pole extensions, and a magnetic ring mounted on said cup-shaped induction element affording a return path for the flux of said rotating magnetic field.

6. In a synchronous motor, the combination of a field coil, a core therein, a pole member connected with one end of said core and comprising pole extensions embracing said coil, a pole member connected with the other end of said core comprising two annular elements having cooperating rings of pole teeth and comprising pole extensions projecting from one of said annular elements and embracing said coil, a rotor shaft, a cup-shaped induction rotor element mounted on said shaft adjacent to said second pole member and embracing said pole extensions, and a synchronous rotor element mounted on said shaft on the outer side of said induction element and having pole extremities rotating adjacent to said rings of pole teeth.

7. In a self-starting synchronous motor, the combination of a field coil, a core therein, a pole member connected with one end of said core and comprising pole extensions embracing the coil, a pole member connected with the other end of said core comprising two annular elements having cooperating rings of pole teeth and comprising pole extensions projecting from one of said annular elements and embracing said coil, means cooperating with one of said pole members for creating a rotating field, a rotor shaft, a synchronous rotor element mounted on said shaft, an induction rotor element mounted on said shaft between said synchronous element and said rings of pole teeth, said induction rotor element comprising a cup-shaped portion embracing said pole extensions, and pole portions on said synchronous rotor element projecting inwardly through said induction rotor element for rotating adjacent to said rings of pole teeth.

8. In a self-starting synchronous motor, the combination of a field coil, a core therein, a pair of pole members connected with one end of said core and comprising pole extensions embracing said coil, lag means interposed between said pole members for lagging the flux in one of said members, a pole member connected with the other end of said core comprising two annular elements having cooperating rings of pole teeth and comprising pole extensions projecting from one of said annular elements and embracing said coil, said latter pole extensions cooperating with the pole extensions of said first named pair of pole members for establishing a rotating flux field, a rotor shaft, a cup-shaped induction rotor element mounted on said shaft and embracing said pole extensions to be acted upon by said rotating flux field, and a synchronous rotor element mounted on said shaft on the outer side of said induction rotor element and comprising pole portions projecting inwardly through openings in said induction rotor element for cooperation with the alternating flux field established between said rings of pole teeth.

9. In a self-starting synchronous motor, the combination of a field coil, a core therein, a pole means connected with the rear end of said core and comprising pole extensions embracing said coil, lag means disposed adjacent to the rear end of said coil for lagging the flux in certain of said pole extensions, pole means connected with the front end of said core comprising two annular elements having cooperating rings of pole teeth and comprising pole extensions projecting from one of said annular elements and embracing said coil, said latter pole extensions cooperating with said first named pole extensions for establishing a rotating flux field, and a rotor comprising a cup-shaped induction element embracing said pole extensions and said coil to be driven by said rotating flux field, and comprising a permanently magnetized synchronous element rotating adjacent to said rings of pole teeth.

10. In a self-starting synchronous motor, the combination of a field coil, a core therein, pole means connected with one end of said core and comprising pole extensions embracing said coil, pole means connected with the other end of said core and comprising two annular elements having cooperating rings of pole teeth and comprising pole extensions projecting from one of said annular elements and cooperating with said first named pole extensions to establish a rotating magnetic field, the flux passing between said rings of pole teeth establishing a stationary axis alternating magnetic field, a synchronous rotor element adapted to rotate in synchronism with said alternating magnetic field, and an induction rotor element disposed between said synchronous rotor element and said rings of pole teeth, said synchronous rotor element having pole portions projecting inwardly through openings in said induction rotor element into proximity to said rings of pole teeth and having limited rotational movement relatively to said induction rotor element.

11. In a self-starting synchronous motor, the combination of a field coil, a core therein, a pole member mounted on one end of said core and comprising pole extensions embracing the coil, a pole member mounted on the other end of said core comprising two annular elements having cooperating rings of pole teeth and comprising pole extensions projecting from one of said annular elements and embracing said coil, longitudinally spaced bearings mounted in the end portions of said core, a rotor spindle journaled in said bearings, a cup-shaped induction rotor element secured to said spindle and embracing said pole extensions, and a permanently magnetized synchronous rotor element rotatably mounted on said spindle on the outer side of said induction rotor element and comprising pole extremities projecting inwardly through slots in said induction rotor element into proximity to said rings of pole teeth, said synchronous rotor element having limited rotational movement relatively to said induction rotor element.

12. In a synchronous motor, the combination of a field coil, a core therein, a pole member mounted on one end of said core comprising a pole extension embracing the coil, a pole member mounted on the other end of said core comprising two annular elements having cooperating rings of pole teeth and comprising a pole extension projecting from one of said annular elements and embracing said coil, means cooperating with one of said pole members for creating a rotating flux field, and a rotor comprising an induction element to be driven by said rotating flux field, and comprising a permanently magnetized synchronous element rotating adjacent to said rings of pole teeth.

13. In a self-starting synchronous motor, the combination of a field coil, a core therein, a pole member mounted on one end of said core comprising a pole extension embracing the coil, a pole member mounted on the other end of said core comprising two annular elements having cooperating rings of pole teeth and comprising a pole extension projecting from one of said annular elements and embracing said coil, means cooperating with one of said pole members for creating a rotating flux field, a rotor comprising a permanently magnetized synchronous element rotating adjacent to said rings of pole teeth, and comprising a cup-shaped induction element embracing said pole extensions, and a magnetic ring mounted on said cup-shaped induction element affording a return path for the flux of said rotating flux field.

14. In a self-starting synchronous motor, the combination of a stator structure comprising a field coil, a core therein, a pole member mounted on one end of said core comprising a pole extension embracing the coil, a pole member mounted on the other end of said core comprising two annular elements having cooperating rings of pole teeth and comprising a pole extension projecting from one of said annular elements and embracing said coil, said pole extensions defining therebetween a first air gap and said rings of pole teeth defining therebetween a second air gap, said stator structure connecting said two air gaps in series relation whereby flux threading said stator structure passes through said two air gaps in series relation, means creating a revolving magnetic field in said first air gap, and a rotor structure responsive to the magnetic fields in said two air gaps.

15. In a self-starting synchronous motor, the combination of a stator structure comprising a field coil, a first set of cooperating pole pieces projecting inwardly over said coil from opposite ends thereof and defining therebetween a first air gap, a second set of cooperating pole pieces adjacent to one end of said coil and defining therebetween a second air gap, said stator structure connecting said two sets of pole pieces in series relation whereby flux threading said stator structure passes through said two air gaps in series relation, means creating a revolving magnetic field in one air gap, and a rotor comprising an element having induction motor characteristics responsive to the rotating magnetic field in said latter air gap, and a permanently magnetized element running as a synchronous element responsive to the magnetic field in the other air gap.

16. In a self-starting synchronous motor, the combination of a stator structure comprising a field coil, a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a revolving magnetic field in one of said air gaps, and a rotor structure responsive to the magnetic fields in said two air gaps, and comprising a cup-shaped rotor element extending over and embracing said coil.

17. In a self-starting synchronous motor, the combination of a stator structure comprising a first set of cooperating pole pieces defining therebetween a first air gap and a second set of cooperating pole pieces defining therebetween a second air gap, said stator structure connecting said two sets of pole pieces in series relation whereby flux threading said stator structure passes through said two air gaps in series relation, means for creating a magnetic flux in said stator structure, means creating a revolving magnetic field in one of said air gaps, and a rotor structure comprising an induction rotor element and a synchronizing rotor element responsive to the magnetic fields in said two air gaps, said synchronizing rotor element being positioned on the outer side of said induction rotor element and comprising pole extensions projecting inwardly through openings in said induction rotor element.

FRED KURZ.